Patented May 18, 1954

2,678,906

UNITED STATES PATENT OFFICE 2,678,906

ANHYDROUS SURFACE-ACTIVE SOLUTIONS

Gustave K. Kohn, Berkeley, Calif., assignor to California Spray-Chemical Corporation, Richmond, Calif., a corporation of Delaware No Drawing. Application August 7, 1950, Serial No. 178,179

6 Claims. (Cl. 202—42)

This invention relates to improvements in the preparation and processing of synthetic surface-active agents, and particularly to a process for the preparation of stable, water-free solvent solutions of surface-active salts of organic derivatives of sulfuric acid such as sulfonates and sulfates for use as wetting and/or emulsifying agents in substantially anhydrous formulations or applications.

Considerable progress has been made in the development of synthetic surface-active agents of the type of organic sulfates and sulfonates for use in the fields of detergents, wetting and emulsification. In composition these agents vary from the sulfated and sulfonated natural oils, such as the petroleum and fatty oils, to the alkaryl sulfonates and aliphatic sulfates and sulfonates. Depending upon the molecular weight of the organic radical, and particularly the aliphatic or alkyl substituent, these synthetic surface-active agents are applicable as wetting agents, emulsifying agents, and/or detergents, etc. Their preparation generally involves the reaction of sulfuric acid and a hydrocarbon or alcohol followed by neutralization with a basic reactant to form the desired salt and neutralize the excess sulfuric acid. The resulting crude product is a mixture of surface-active salt, inorganic sulfate and water in which the concentration of surface-active salt varies with the particular method of preparation. Further processing of the crude product is largely dependent upon the allowable tolerances and economics of the end use. Generally, these surface-active agents are produced in the form of slurry or spray- or drum-dried product containing appreciable amounts of inorganic sulfate.

In a number of applications, the inorganic sulfate tolerance is very low by virtue of the oil-insolubility of the sulfate and/or its salting-out on evaporation in aqueous solutions. The removal of minor amounts of inorganic sulfate entails considerable processing and solvent extraction at uneconomical temperatures. In spite of the marked differences in solubility of the active agent and inorganic sulfate in the conventional water-soluble alcohols, the product always contains residual amounts of the inorganic salt due to the moderate solubility of the inorganic sulfate in the alcohol, and in the organic sulfate or sulfonate, even at low extraction temperatures.

Again, for certain applications, the surface-active agent must be in anhydrous form and either provided in a solvent solution or suitable for formulation in solvent media. This type of specification is particularly significant in their application as wetting and emulsifying agents. Rendering the crude product anhydrous may be easily accomplished by drying or evaporating, e. g., spray- or drum-drying which is the conventional practice, but the resulting anhydrous product is extremely difficult to take up in a suitable solvent, particularly if any appreciable amounts of inorganic sulfate are present. The usual practice is to utilize a portion of the original organic charge to the sulfonation reaction as the solvent medium. This naturally is a waste of charge stock and, in the majority of instances, does not provide a medium with satisfactory solvent powers.

Contrasting the experiences of the prior art, it has now been found possible to prepare anhydrous solutions of a surface-active agent in a variety of solvents in spite of the presence of varying amounts of inorganic sulfate up to 15% by weight and obtain a clear to translucent liquid solution which is stable at temperatures as low as 0° C. without precipitation or separation of inorganic sulfate. The solvated surface-active agents so produced are suited for multiple uses and formulations and are particularly adapted to uses as wetting and emulsifying agents in non-aqueous formulations and applications involving water-sensitive materials such as certain insecticides, inks, dyestuffs, cosmetics, etc. Additionally, the method of preparing the anhydrous solvated agents may either be applied to the commercially finished products or incorporated as an integral of the conventional synthesis processes.

The essential feature of the present process involves a co-distillation of an aqueous dispersion of a surface-active salt of an organic hexavalent oxy-acid of sulfur containing up to 15% by weight of an inorganic sulfate, based on the surface-active salt, with a high boiling, water-immiscible aromatic solvent, and maintaining the co-distillation to a liquid temperature of at least 120° C. This co-distillation process may be conducted integrally with a conventional inorganic sulfate extraction or may be applied to a commercial product containing up to 15% inorganic sulfate. In the case of an anhydrous product, the surface-active agent is redispersed in water and/or slurried with the solvent and then subjected to the co-distillation process.

In its general application, the process may be applied to any of the conventional organic sulfates and sulfonates which possess surface-active properties and are prepared by the action of sulfuric acid or a sulfonating agent upon a reactive organic charge followed by neutralization and incidental formation of inorganic sulfate. The resultant salts of organic derivatives of sulfuric acid must necessarily be sufficiently oil-soluble in the aromatic solvent to obtain a solvated surface-active agent of desired concentration. It is preferable to operate with a surface-active agent which is at least 25% soluble in the particular aromatic solvent employed. Specifically, these organic sulfates and sulfonates include the aromatic and aliphatic sulfonates, as well as the salts of the sulfates of mono- and polybasic alcohols, such as the alkaryl and petroleum or mahogany sulfonates and the sulfated fatty alcohols and glycerides. In the further detailed description of the process, reference will be made to the preferred alkaryl sulfonates or alkyl benzene sulfonates in which the alkyl radical contains from 9 to 18 carbon atoms.

The cation portion of these surface-active sulfates and sulfonates may be derived from the alkali, alkaline-earth, or heavy metals, as well as ammonia and the various amines. Representative of the salts to which the invention has been applied are the sodium, magnesium, aluminum, lead and triethanolamine salts. The preferred surface-active salts are the sodium salts of the aforementioned alkyl benzene sulfonic acids.

In the conventional neutralization of the synthetic sulfonic acids, considerable inorganic sulfate is formed. A major proportion of this inorganic sulfate is normally extracted by settling and the active sulfonate concentrated by extraction with the low molecular weight alcohol. The removal of the remaining minor proportion of inorganic sulfate requires extensive processing, which is uneconomical for commercial operations. This residual sulfate in aqueous solutions causes clouding and scum formation on the surfaces to which the surface-active agent is applied. This inorganic sulfate is insoluble in conventional solvents and normally prevents solvation or causes gelation with the conventional solvents.

These difficulties may be resolved by the process of the present invention, wherein the surface-active sulfonate containing up to 15% by weight of inorganic sulfate may be rendered substantially solvated with a water-immiscible aromatic solvent by a co-distillation process conducted to a liquid temperature of at least 120° C. The water-immiscible aromatic solvent may be any of the conventional high boiling aromatic solvents and, particularly, the mononuclear aromatics which possess a boiling point of at least 100° C.

Representative of the particular solvents which have been found suitable for the preparation of anhydrous surface-active concentrate solutions of numerous organic sulfonates and sulfates may be mentioned toluene, ortho-, meta- and paraxylene, nitrobenzene, and high boiling aromatic fractions of petroleum refinery distillates. Other specific water-immiscible solvents may be used to effect an anhydrous solution in accordance with the present process. Their choice is dependent upon the desired concentration of surface-active sulfonate and such factors as solvent costs, compatibility of the solvent in the projected end use, and the distillation time required to complete the water removal. The maximum concentration of surface-active agent in the solvent will vary according to the solubility of the specific sulfonate in the various solvents, and the distillation time required to complete the water removal is a function of the boiling point or range of the individual solvent.

In order to facilitate the removal of the major proportion of the occluded or hydrated water, it has been found desirable to conduct the initial stages of the co-distillation in the presence of a low-boiling solvent or use a high-boiling solvent which contains an appreciable content of low-boiling constituents. Thus, a low-boiling water-immiscible solvent such as benzene may be used to co-distill or azeotrope the major body of water, and the product finished off and rendered anhydrous by co-distillation with the high-boiling solvent.

In general, the subject process may either be applied integral with the preparation of the surface-active sulfonate following the conventional alcohol removal of inorganic sulfate, or to the finished aqueous slurry or dried sulfonate powder.

*Example I*

A slurry containing approximately 35% sodium alkyl aryl sulfonate and 5% sodium sulfate was mixed with 91% alcohol in such proportion that the final ratio of water to alcohol was 60%. After agitation the insoluble sodium sulfate was removed by filtration and the filtrate heated. The alcohol and water binary were removed until a gel resulted at about 85° C. A technical xylene solvent was added in amounts such that the final solution contained between 30 and 45% sulfonate. This mixture was then refluxed with water and alcohol separated from the mixture. The mixture was continuously refluxed with an automatic water separator to a liquid temperature of 140° C. with sulfonate concentrations at around 45%. A viscous, clear, amber, solution is obtained which is less viscous at lower concentrations. The resulting anhydrous sulfated concentrate is stable, even at temperatures as low as 0° C., with no inorganic sulfate separation.

*Example II*

An aqueous slurry of alkyl aryl sulfonate containing less than 15% by weight of an inorganic sulfate based upon the sulfonate was added to benzene in such quantities as to obtain approximately a 10% solution. This mixture was refluxed and the water separated until the original milky mixture transformed to amber transparent to translucent solution, at which time the second addition of approximately the same slurry was added. This procedure was repeated until such time as the required amount of sulfonate was solubilized. Water and benzene were then continuously removed until the temperature reached 90° C. A xylene solvent was then added and the water-in-solvent removal continued until the temperature reached 140° C.

Both of the above distillation processes were conducted on sulfonate salts of sodium, magnesium, aluminum, lead, and triethanolamine. The sulfonates themselves were synthetic alkyl aryl sulfonates and by-product petroleum sulfonates of the mahogany and green acid types resulting from acid-treating of distillate stocks.

*Example III*

A dried synthetic sodium alkyl aryl sulfonate assaying 95% sulfonate and 5% sulfate was added to crude xylene solvent in amount corresponding to a finished concentration of 30% sulfonate. The mixture was agitated and heated until, at 80° C., a clear solution was obtained. The heating was continued and the temperature increased to 140° C. to insure removal of all traces of water. The final product was an amber-clear to translucent liquid of moderately low viscosity, which was stable without separation of inorganic sulfate even at 0° C.

*Example IV*

In all of the co-distillation processes utilizing a xylene solvent, the time required for complete water-removal varied from about 1½ to 2 hours. Following the aforementioned procedures, a stable sulfonate solution was obtained by co-distillation with toluene. The temperatures required for complete water removal varied from 120–125° C. Depending upon the mol fraction of toluene in the solution, the distillation time varied between 3 and 4 hours. The final product was a translucent 30% sulfonate solution, which was stable to inorganic sulfate disposition. Using nitrobenzene, stable sulfonate solutions were obtained at concentrations of below 30% sulfonate. The final liquid temperatures necessary for complete water removal were about 160° C.

*Example V*

292 gallons of 86% recovered isopropyl alcohol (2,000 pounds) and 54 gallons of 99% isopropyl alcohol (351 pounds) were placed in a large vessel of 1500-gallon capacity equipped with a stirrer. 4,390 pounds (535 gallons) of a soap slurry containing 52% sodium alkyl benzene sulfonate, 7.8% sodium sulfate and 40.2% water, which is a neutralized product from the sulfonation process, was added to the alcohol solution and stirred for a half-hour at room temperature to permit maximum crystal growth. A total of 239 pounds of sodium sulfate was precipitated, leaving 103 pounds still in solution. Since a large part of the sulfate precipitates as the decahydrate, about 294 pounds of water were also removed as water crystallization. The precipitated sodium sulfate was removed by filtration and the filtrate returned to the vessel. The composition of the filtrate was 35% sodium alkyl benzene sulfonate, 1½% sodium sulfate, 28.6% water and 34.9% alcohol. This mixture was heated to distill off alcohol for recovery purposes, the usual amount of recovery being about 292 gallons (2,000 pounds) of 86% alcohol. The distillation was interrupted when the rate dropped below 1 gallon per minute in order to avoid the formation of a gel of low heat transfer properties. Half of the hot soap slurry was removed to a holding tank, and 747 gallons (5,327 pounds) of technical xylene was added to the remainder. The hot soap slurry was divided and added to the xylene in incremental portions to avoid the formation of a stiff gel which is difficult to bring into solution. Co-distillation was begun and the distillate run through a conventional water separator. The distillation was continued until the liquid pot temperature reached 100° C., at which point the remainder of the soap slurry was added. The distillation was continued to a liquid temperature of 140° C., at which point water removal had ceased. The resulting xylene solution of sodium alkyl benzene sulfonate was a clear, viscous, amber solution which was stable to inorganic sulfate separation.

Obviously many modifications and variations of the invention as hereinabove set forth may be made without departing from the spirit and scope thereof, and only such limitations should be imposed as are indicated in the appended claims.

I claim:

1. The preparation of a stable, liquid solution of a surface-active salt of a hexavalent oxy-acid of sulfur in a $H_2O$-immiscible aromatic solvent which comprises subjecting an aqueous dispersion of a surface-active salt of an organic hexavalent oxy-acid of sulfur containing an inorganic sulfate in amounts less than about 15% by weight based on said surface-active salt, to conditions of co-distillation at atmospheric pressure with a high-boiling, $H_2O$-immiscible aromatic solvent which is capable of co-distilling with water at temperatures of at least 120° C. and maintaining said distillation to a liquid temperature of at least 120° C. until the resulting solution of said surface-active salt is substantially anhydrous.

2. The preparation of a stable, liquid solution of a surface-active sulfonate in a $H_2O$-immiscible aromatic solvent which comprises subjecting an aqueous dispersion of a surface-active salt of an organic sulfonic acid containing an inorganic sulfate in amounts less than about 15% by weight based on the sulfonate, to conditions of co-distillation at atmospheric pressure with a high-boiling, $H_2O$-immiscible aromatic solvent which is capable of co-distilling the water at temperatures of at least 120° C. and maintaining said distillation to a liquid temperature of at least 120° C. until the resulting solution of said surface-active salt is substantially anhydrous.

3. The preparation of a stable liquid solution of a surface-active alkyl aryl sulfonate in a water-immiscible aromatic solvent, which comprises subjecting an aqueous dispersion of a surface-active salt of an alkyl aryl sulfonic acid containing an inorganic sulfate in amounts less than about 15% by weight, based on said alkyl aryl sulfonate, to conditions of co-distillation at atmospheric pressure with a high-boiling water-immiscible aromatic solvent which is capable of co-distilling with water at temperatures of at least 120° C. and maintaining said distillation to a liquid temperature of at least 120° C. until the resulting solution of said surface-active salt is substantially anhydrous.

4. The process of claim 3, wherein said surface-active salt is a sodium salt of an alkyl aryl sulfonate and the inorganic sulfate is sodium sulfate.

5. The preparation of a stable liquid solution of a surface-active alkyl aryl sulfonate in a water-immiscible aromatic solvent, which comprises subjecting an aqueous dispersion to a surface-active salt of an alkyl aryl sulfonic acid containing an inorganic sulfate in amounts less than about 15% by weight, based on said alkyl aryl sulfonate, to conditions of co-distillation at atmospheric pressure with a mixture of high- and low-boiling water-immiscible aromatic solvents, said high-boiling solvent being capable of co-distilling with water at temperatures of at least 120° C., and maintaining said distillation to a liquid temperature of at least 120° C. until the resulting solution of said surface-active salt is substantially anhydrous.

6. The process of claim 5, wherein at least one of said water-immiscible solvents is a mononuclear aromatic solvent having a boiling point greater than 100° C.

References Cited in the file of this patent

UNITED STATES PATENTS

| Number | Name | Date |
| --- | --- | --- |
| 1,989,541 | Blanchod | Jan. 29, 1935 |
| 2,012,199 | McElroy | Aug. 20, 1935 |
| 2,140,263 | Kessler | Dec. 13, 1938 |
| 2,144,654 | Guthmann et al. | Jan. 24, 1939 |
| 2,178,786 | Fasce et al. | Nov. 7, 1939 |
| 2,209,169 | Mikeska | July 23, 1940 |
| 2,316,719 | Russell et al. | Apr. 13, 1943 |
| 2,371,010 | Wolfner | Mar. 6, 1945 |
| 2,474,735 | Harmon | June 28, 1949 |
| 2,497,152 | Cohen | Feb. 14, 1950 |